United States Patent [19]

Jackson

[11] 4,344,591
[45] Aug. 17, 1982

[54] MULTIWALL THERMAL PROTECTION SYSTEM

[75] Inventor: Liam R. Jackson, Newport News, Va.

[73] Assignee: The United States of America asrepresented by the Administrator of the National Aeronautics and Space Administration, Washington, D.C.

[21] Appl. No.: 72,857

[22] Filed: Sep. 5, 1979

[51] Int. Cl.³ .............................................. B64C 1/58
[52] U.S. Cl. .............................. 244/158 A; 244/132; 428/594; 428/604; 428/607; 428/608
[58] Field of Search .................. 102/105; 244/117 A, 244/131, 132, 133, 163, 158 A; 428/593, 594, 604, 607, 608; 250/515

[56] References Cited

U.S. PATENT DOCUMENTS

| | | | |
|---|---|---|---|
| 2,945,653 | 7/1960 | Atkin | 244/132 |
| 3,236,476 | 2/1966 | White | 102/105 |
| 3,243,313 | 3/1966 | Aves | 244/117A |
| 3,270,908 | 9/1966 | Faget | 244/117 A |
| 3,395,035 | 7/1968 | Strauss | 102/105 |
| 3,490,718 | 1/1970 | Vary | 244/163 |
| 3,799,056 | 3/1974 | Colignon | 102/105 |
| 4,071,194 | 1/1978 | Eckert | 244/117 A |
| 4,151,800 | 5/1979 | Dotts | 244/163 |
| 4,161,567 | 7/1979 | Sturgeon | 428/494 |
| 4,161,567 | 10/1964 | Jackson . | |
| 4,164,339 | 8/1979 | McClenny | 102/105 |

FOREIGN PATENT DOCUMENTS 1272591  5/1972  United Kingdom ........... 244/117 A

OTHER PUBLICATIONS

"R" reference, pp. 28–29, 38–39, 40–41.
Niblock and Reeder, *Four Space Shuttle Wing Leading Edge Concepts*, 11 J. Spacecraft 314-20 (No. 5, May 1974).
Levy, Locke & Leggett, *Composite Ceramic–Metal Systems, Astronautics* (Apr. 1961), pp. 27–29.

*Primary Examiner*—Stephen C. Bentley
*Attorney, Agent, or Firm*—Wallace J. Nelson; John R. Manning; Howard J. Osborn

[57] ABSTRACT

Multiwall insulating sandwich panels are provided for thermal protection of hypervelocity vehicles and other enclosures. In one embodiment of the invention the multiwall panels are formed of alternate layers of dimpled and flat metal (titanium alloy) foil sheets and beaded scarfed edge seals to provide enclosure thermal protection up to 1000° F. An additional embodiment employs an intermediate fibrous insulation for the sandwich panel to provide thermal protection up to 2000° F. and a third embodiment employs a silicide coated columbium waffle as the outer panel skin and fibrous layered intermediate protection for thermal environment protection up to 2500° F.

The use of multiple panels of the present invention on an enclosure facilitate repair and refurbishment of the thermal protection system due to the simple support provided by the tab and clip attachment for the panels.

15 Claims, 7 Drawing Figures

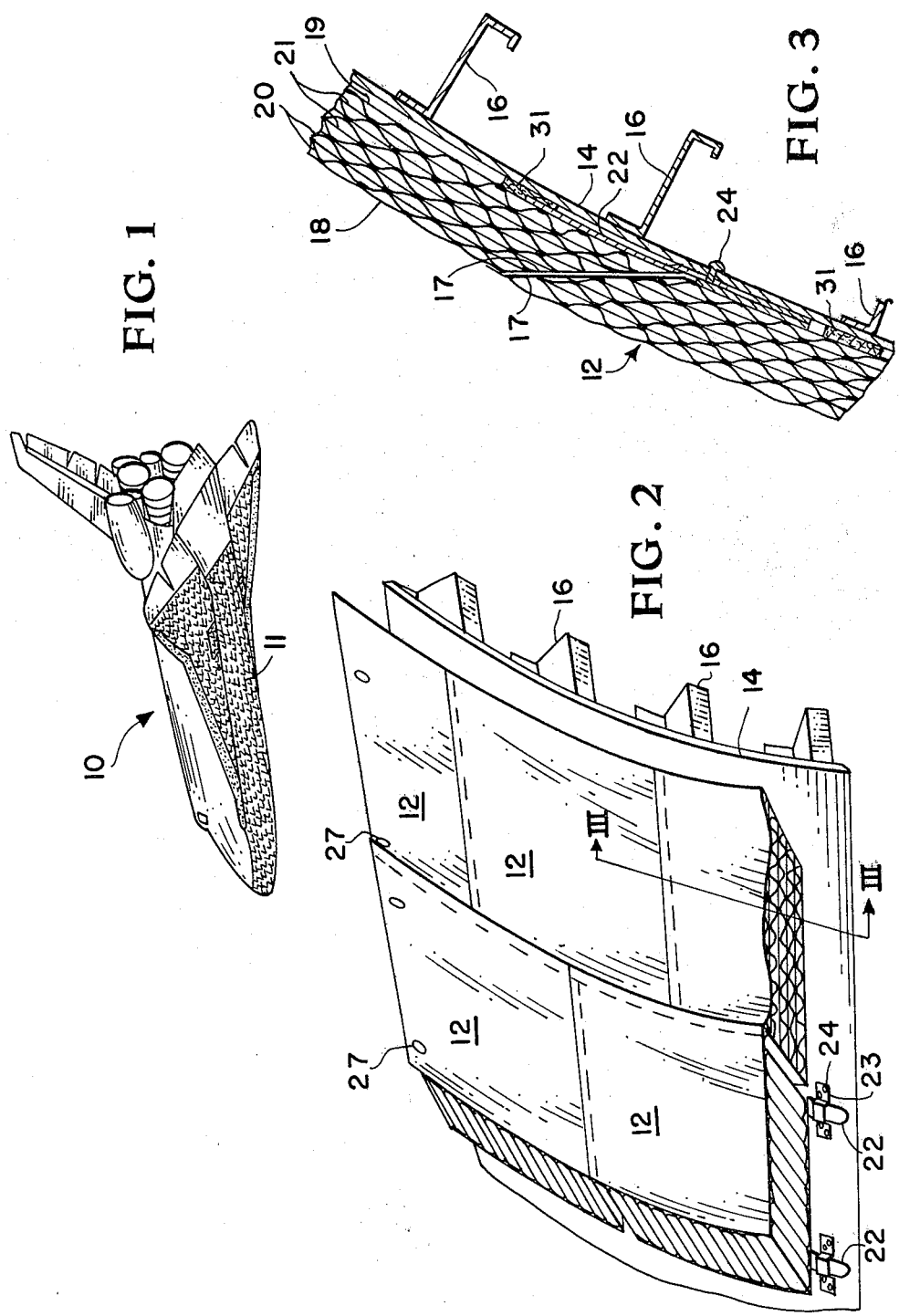

MULTIWALL THERMAL PROTECTION SYSTEM

ORIGIN OF THE INVENTION

The invention described herein was made by an employee of the United States Government and may be manufactured or used by or for the Government for Governmental purposes without the payment of any royalties thereon or therefor.

BACKGROUND OF THE INVENTION

This invention relates generally to apparatus for providing thermal protection for hypervelocity vehicle structures that are subjected to aerodynamic heating during the flight profiles thereof.

In design of thermal protection systems (TPS) for aerospace vehicles, an effective means of transmitting aerodynamic loads (shear, and in some cases pressure differences) through the TPS is essential. That is, the load transfer system must have low weight, result in low thermal stresses, and not transfer excessive heat to the underlying structure.

Two primary approaches have previously been developed to satisfy these load-bearing and thermal isolation functions at low thermal stresses. One approach employs metal heat shields supported by slender metal stand-off supports that penetrate a nonload-bearing insulation. The flexible stand-offs of this prior art system bend as the shields expand on heating, thus imposing little restraint or thermal stress. This approach requires many small pieces forming a complex installation. The other approach employs a load-bearing insulation attached to the primary structure. Since most load-bearing insulations have low strength and no ductility, they are usually segmented with small gaps for low thermal stress. One load-bearing insulation previously developed includes the sintered quartz-fiber tiles now anticipated as the reusable surface insulation of the space shuttle. Generally, the nonmetallic insulations are simple to attach to the structure, but they have a common potential disadvantage. That is, they are weak, brittle materials, consequently, surface frayings, erosion, cracking or breakage rates may be high and may increase refurbishment requirements.

There is therefore a definite need in the art for an efficient thermal protection system that has the toughness of the metal shield systems and the simplicity of the load-bearing insulation systems.

Accordingly, it is an object of the present invention to provide a new and improved thermal protection system for hypervelocity vehicles.

Another object of the present invention is to provide new and novel insulating tiles for thermal protection of aerodynamic vehicles.

Another object of the present invention is to provide a thermal protection system for hypervelocity vehicle structures that is simple to refurbish but that normally requires little if any refurbishment.

An additional object of the present invention is to provide a new and novel assembly process for mechanically attaching insulating panels or tiles to a primary enclosure or vehicle structure.

The foregoing and other objects of the present invention are attained by providing the exterior surface portions of the hypervelocity vehicle to be protected in the form of a plurality of insulating multiwall panels or tiles mechanically attached to the primary vehicle structure. The primary vehicle structure may be of any conventional construction and is not alone considered as part of the present invention. The insulating multiwall tiles in one embodiment of the present invention are formed from multiple layers of metal foils that are alternately dimpled and nondimpled or smooth surface and joined at the dimpled contacts to form a strong insulation. The four edges of each tile are sealed and scarffed to minimize heat transfer through the panel edges. Each tile is attached to the primary vehicle structure by slip joints and a simple support. This attachment minimizes thermal stresses in the tiles and the primary vehicle structure. Also, vehicle structural strains are not transmitted to the tiles. No through fasteners are required except for the last tile in each row which is generally located at or near the top of the vehicle where less heating would be present for a particular fuselage station. Suitable felt seals are bonded to the periphery of each tile adjacent to the individual tile edges to prevent lateral flow of air into these spaces. The scarffed tile edges are sealed by metal strips with a vent being provided on the tile edge periphery and each tile edge beaded to inhibit air flow along the tile edges. Also, the two trailing edges of each tile overlap the two leading edges of the adjacent downstream tile or tiles.

For higher temperature applications an additional embodiment of the present invention utilizes metal foil inner and outer skin layers, joined at the peripheries by the beaded scarffed edge seals, sandwiching an interior layer of thermal insulation batts therebetween. And for even higher temperatures, the interior multiwall panel layer remains the same metal foil while the exterior layer is constructed of a silicide coated refractory metal waffle, such as for example, columbium. The sandwich interior of this embodiment is a layer of zirconia insulation disposed over a layer of thermal insulation, for example, microquartz. The attachment mechanism for each multiwall panel embodiment, to the hypervelocity vehicle, is identical.

BRIEF DESCRIPTION OF THE DRAWINGS

A more complete appreciation of the invention and many of the attendant advantages thereof will be more readily apparent as the same becomes better understood by reference to the following detailed description when considered in connection with the accompanying drawings wherein:

FIG. 1 is a view of an exemplary vehicle utilizing the thermal protection system of the present invention;

FIG. 2 is a partial view of the thermal protection tiles of the present invention attached to the exterior primary vehicle or other enclosure structure;

FIG. 3 is a sectional view taken along lines III—III of FIG. 2;

DETAILED DESCRIPTION OF THE DISCLOSURE

Figure 4:
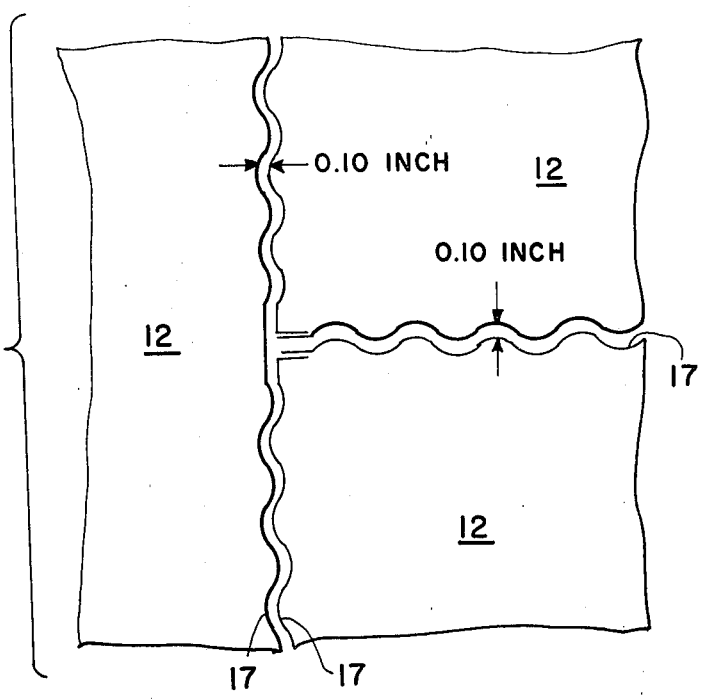
FIG. 4 is a view looking normal to the assembled tiles of the present invention with the outer layers or skins thereof omitted to show the tile edge seal details.

Referring now to the drawings, FIG. 1 illustrates an exemplary hypervelocity vehicle, generally designated by reference numeral 10, that utilizes the thermal protective system 11 of the present invention. Vehicle 10 is the proposed space shuttle and requires thermal protection on portions thereof during re-entry into the earth's atmosphere and during other hypervelocity flight. The lower half of vehicle 10 and the leading edges of the wings thereon require the greatest protection as will be further discussed hereinafter.

Referring now more particularly to FIGS. 2 and 3, a plurality of multiwall thermal protection panels or tiles 12 are mechanically attached to selected surface area 14 of vehicle 10 or other suitable enclosure. Surface area 14 is attached to and supported by load bearing channels 16 of vehicle 10 in a conventional manner. Panels 12 are formed of metallic load bearing insulation and installed as individual tiles on vehicle 10. Panels or tiles 12 provide adequate thermal protection for enclosures to aerodynamic surface temperatures of approximately 1000° F. Each panel 12 is formed of a lightly dimpled exterior skin 18, which forms the aerodynamic surface, and an interior skin 19 of plain or smooth surface metal foil sheets. A series of alternate dimpled and smooth metal foil sheets, designated respectively by reference numerals 20 and 21, are diffusion bonded together and to the exterior and interior skins at the dimple crests thereof to form a strong load-bearing panel. Panel 12 is sealed on all four sides by a beaded edge seal 17 diffusion bonded to exterior skin 18 and interior skin 19 as will be further explained hereinafter.

Thermal stresses of panels 12 are minimized by using a simple support slip joint attachment. This slip joint is formed by two tabs 22, diffusion bonded or otherwise secured to the inside surface of panel 12, and received by structural clips 23. These structural clips 23 are secured to surface 14 of vehicle 10 via blind rivets 24 or other conventional attachments. In the preferred embodiment two tabs 22 are employed, one on each bottom corner of the inner surface of each tile 12 that is assembled to vehicle surface 14. A pair of tile clips 25 are disposed on the same side of each tile 12 at opposite corners to the tabs 22. Tile clips 25 are diffusion bonded to tile 12 and adapted to receive the ends of tabs 22 on an adjacent tile 12 when assembled, as will be further explained hereinafter.

The tab-clip arrangement thus provides four-corner, slipjoint and simple support attachment for the individual tiles 12. Simple support of the tiles 12 is provided by flexibility of tabs 22 and by the clearance provided between the tabs and clips. This attachment minimizes thermal stresses in the tiles and structure surface 14 of vehicle 10 while also prohibiting structural strain from being transmitted to the individual tiles. No through fasteners are required except for the last tile in each row which may be located at or near the top of the vehicle or area of least heating. These through fasteners would, for example, be in the form of a pair of heat resistent cap screws (27, FIG. 2) with riveted nut plates (not shown) for each corner of the tile at the end of each tile row extending around the vehicle.

As shown more particularly in FIGS. 2 and 3, the four edges 17 of each tile 12 are scarffed to minimize heat transfer through the panel edges. Beaded edge seals 17 are formed from metallic foil and diffusion bonded to each other and to top layer 13 and bottom layer 15 to seal each of the individual tile edges. The beaded surface in adjacent tiles are adapted to nest with each other as shown in FIG. 4.

Figure 5:
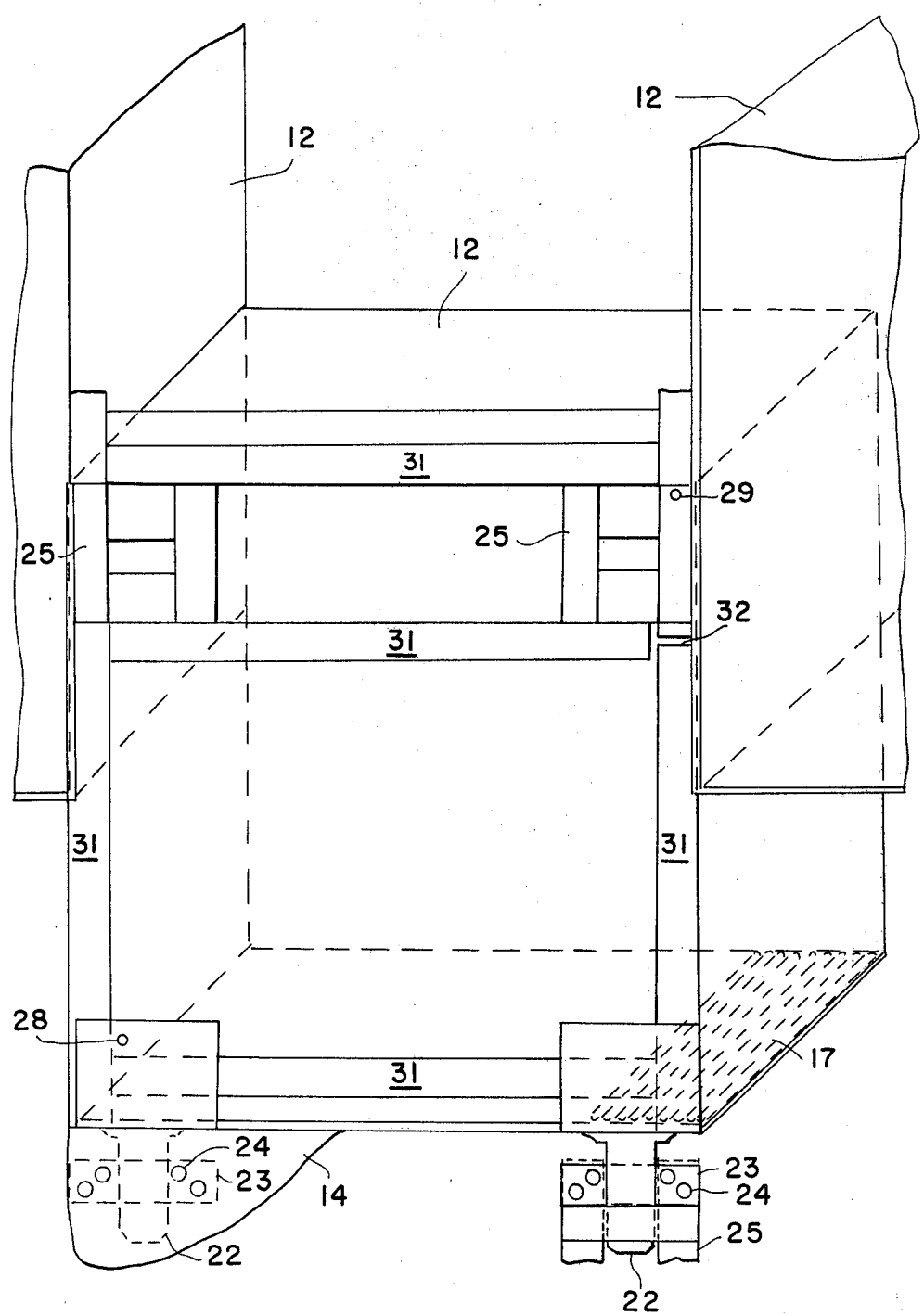
FIG. 5 is a part schematic view looking normal to the inside surface of a tile as in FIG. 2, with parts omitted for clarity and illustrating the tile venting, tab and clip attachment for each tile and the felt packing arrangement for each tile.

As shown in FIG. 5, a first single vent 28 is formed through the forward seal wall 17 and a second vent 29 is formed in the aft seal wall to vent the inside tile area to the atmosphere and thereby avoid pressure buildup during heating within the individual tiles. Four strips of suitable packing material 31, such as for example, Dupont's Nomex Felt, are adhesively bonded to either the tile or the vehicle surface around the periphery of each tile 12. These felt strips are compressed when tiles 12 are assembled and serve to eliminate vibration of the tiles and effectively seal the area between the individual tiles and surface 14 of vehicle 10 from lateral flow of air. A single vent 32 disposed within the aft felt strip 31 serves to vent the space enclosed by the felt packing to the atmosphere and prevent a pressure or moisture buildup within this space.

Figure 6:
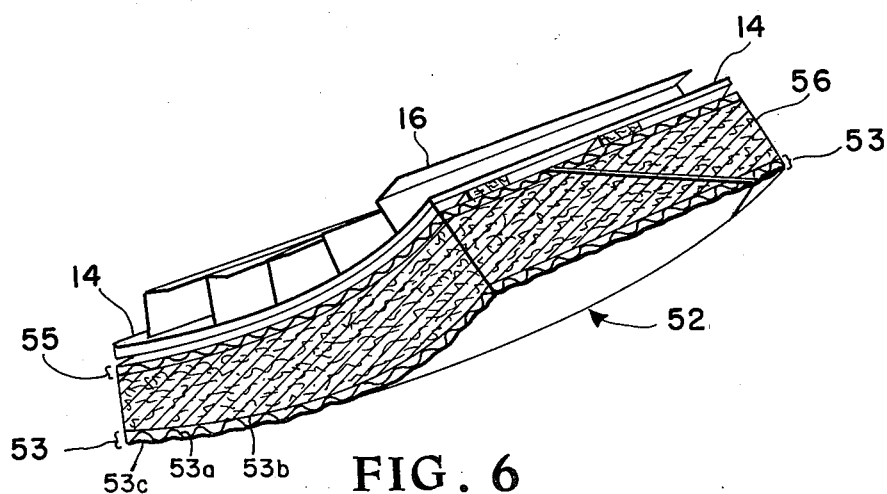
FIG. 6 is a part sectional view of a thermal protection tile or panel according to the present invention and utilizing fibrous insulation filler material.

Referring now more particularly to FIG. 6, modified panel tiles 52 are shown attached to surface 14. The attachment mechanism for tiles 52 is identical to that described hereinbefore for tiles 12, however tiles 52 are employed where thermal protection in the range of 1500° F. is needed.

Panels 52 have an exterior skin or layer 53 formed of an intermediate dimpled sheet 53a, an inner septum or flat foil sheet 53b and a lightly dimpled exterior sheet 53c, each sheet being a nickel alloy, such as for example, "René-41." These three foil sheets are diffusion bonded at the dimple crests of the intermediate sheet into a unitary skin. René-41 is commercially available from General Electric and other suppliers. In a specific example, skin 53 was constructed from an outer or exposed "René-41" foil sheet of 0.003 inch thickness, an intermediate dimpled foil sheet of 0.003 inch thickness and an inner foil sheet of 0.0015 inch thickness. An intermediate suitable fibrous insulation 56, such as for example, batts of Johns-Manville's Microquartz having a density of 4.5 lb/ft$^3$, are provided and the panel interior layer or skin 55 is identical to that of the embodiment of FIGS. 1–3. Batts of John-Manville's Dyna-Flex fibrous insulation may be substituted for the hotter part of the Microquartz layer 56 for temperature protection up to 2000° F. Layer 55 consists of a dimpled foil of titanium alloy (Ti-6Al-4V) diffusion bonded on each side at the dimple crests to a smooth or septum surface foil layer of like material. The dimples in each of the dimpled foil layers are of approximately 0.170 inch depth and disposed in a square grid pattern approximately 0.50 inch apart. The contact points for each dimple in the assembled panels is approximately 0.040–0.060 inch. The lightly dimpled exterior foil sheets have the same grid pattern with the dimple depth being in the range of 0.020–0.030 inch. In this same specific example the exterior foil and dimpled foil of skin 55 are constructed of 0.003 inch thickness titanium alloy (Ti-6Al-4V), while the interior foil is of 0.0015 inch thickness of the same material. This same titanium alloy and dimple dimensions were used to construct the embodiment illustrated in FIGS. 1–3.

Figure 7:
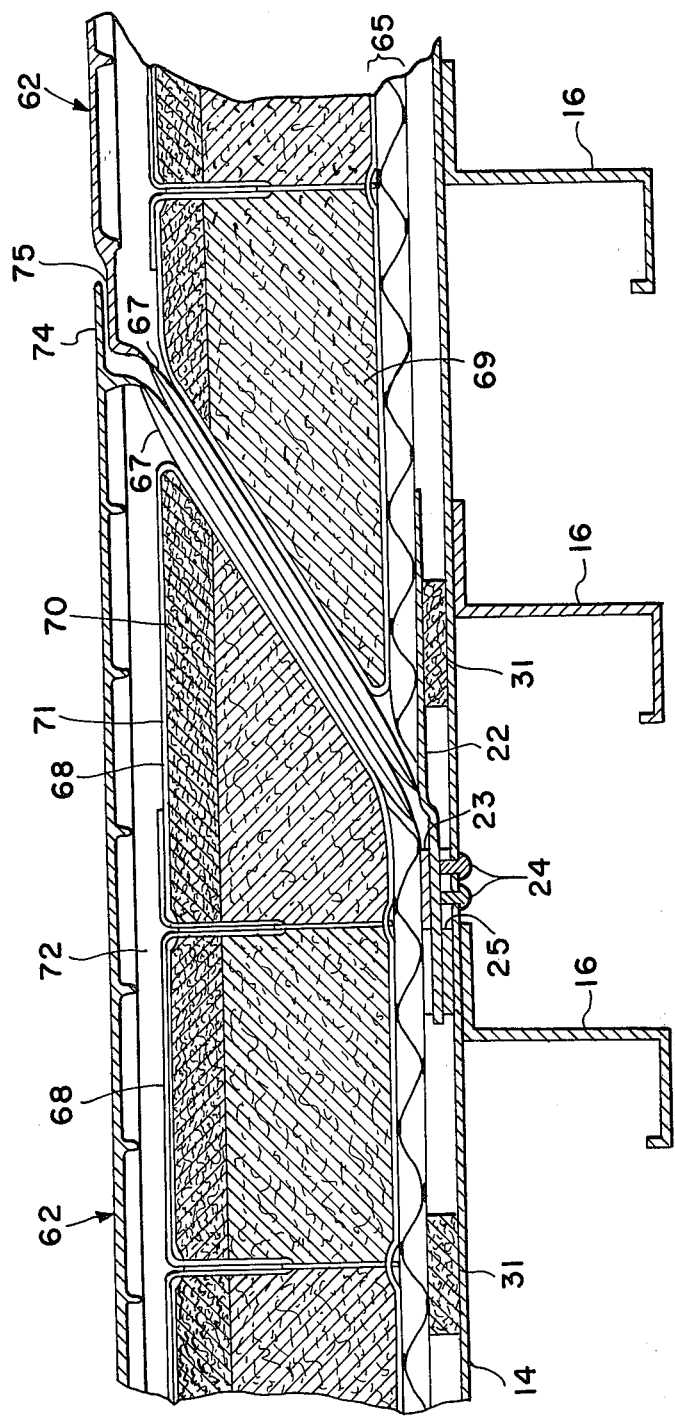
FIG. 7 is a part sectional view of a refractory metal multiwall thermal protection panel or tile according to the present invention.

Referring now more particularly to FIG. 7, thermal protective tiles 62 are shown that are capable of thermal protection of an enclosure or a vehicle structure 14 in the temperature range of 2500° F. In panels 62, the exterior skin or exposed surface is formed of columbium waffles having a 0.003 inch thick coating of silicide thereon and as designated by reference numeral 63. The beaded panel edge seals 67 are also formed of silicide coated columbium and connect the exterior waffle layer with an interior titanium multiwall or skin 65. As in the previously described embodiments and as shown in FIG. 4, the beaded seals nest with like beaded seals on adjacent tiles to provide a labyrinth seal that inhibits air flow along the tile edges. The area defined by exterior skin or waffle 63, edge seals 67 and bottom layer or skin 65 houses thermal protective fibrous insulation in individual compartments or batts 68. Each batt 68 is individually formed and houses a layer 69 of microquartz fibrous insulation and a thinner layer 70 of zirconia fibrous insulation of approximately one-half the thickness as the microquartz layer. A bag or batting 71 of zirconia cloth is sewn with zirconia thread to enclose each segment of the microquartz-zirconia fibrous insulation into a unitary structure or batt 68. Each batt 68 is then adhesively bonded to bottom layer or skin 65 to leave a definite air gap 72 between coated waffle 63 and batts 68. Any suitable adhesive, such as for example, a R.T.V. silicon adhesive or an inorganic high temperature resistant cement, such as Insa-Lute Adhesive Cement made by Sauereisen Cements Company of Pittsburg, Pennsylvania, may be employed for this attachment. The Sauereisen cement cures into an unglazed porcelainized finish that will withstand temperatures in the 2000° F. range. This air gap 72 is essential to prevent any chemical reaction between the coating on waffle 63 and the zirconia.

An overlap area 74 is provided along the two trailing edges of each tile 62 with an appropriate recessed area 75 provided on the two leading edges of each tile to receive this overlap. In the previously described embodiments of FIG. 3 and FIG. 6 the same overlap relationship is provided but the need for a complementary recessed area does not exist due to the limited thicknesses (0.003 inch) of the foil layers.

Although no specific exterior tile dimensions have been discussed, the tiles of the present invention are nominally twenty inches square, have a thickness range of approximately two-tenths inches to four inches and the angular sides are nominally 30° with respect to the vertical. Due to the staggered relationship the last tile in each row may be of different dimensions as shown in FIG. 2, and tiles may be larger than the nominal toward the aft end of the vehicle, thus reducing the total number of tiles per vehicle. The interior surface area of each tile are also highly polished while the exposed exterior surface area is oxidized or treated to an emissitivity ($\epsilon$) in the range of 0.8.

The titanium alloy multiwall tiles 12 shown in FIG. 3 provide adequate thermal protection for hypervelocity vehicle structures (normally aluminum alloys thereof) for exterior surface temperatures up to 1000° F. Panels or tiles 52 (FIG. 6) provide thermal protection up to 1500° F. when employing only Microquartz as the insulation sandwich and up to 2000° F. if Dyna-Flex is employed in combination with Microquartz as the insulation layer. The Microquartz and Dyna-Flex employed in the specific embodiments described herein have densities of 4.5 and 6.2 lb/ft$^3$, respectively, and are tradenames for fibrous insulation available from the Johns-Manville Company.

Hypervelocity vehicles and like structures may also be protected up to 2500° F. when employing the silicide coated columbium panels or tiles 62 as illustrated in FIG. 7. Obviously any combination of tiles 12, 52 and 62 may be employed on any single vehicle where different temperatures are anticipated. For example, the heavier and more protective tiles 62 may be employed near the leading edges of a re-entry vehicle that would be subjected to more intense thermal environment, with intermediate thermal protective tiles 52 being employed adjacent to tiles 62 where less thermal protection is needed and the lighter (thinner) all metal tiles 12 being employed where temperatures are not expected to exceed 1000° F.

Thus, in some hypervelocity vehicles, only tiles 12 would be needed for thermal protection while in others, combinations of tiles 12, 52 and 62 may be required. In any event, the common novel attachment for each of the tiles enables ready substitution of one type for another with a minimum of effort. Also, when it is necessary to refurbish all or portions of a vehicle thermal protection system the present invention provides a rapid, relatively inexpensive and readily accessible process for this work. For refurbishment, the end or top member of the row of tiles needing replacement of members therein would be removed and each tile in the row down to the one or ones needing replacement would be progressively removed to reach the damaged tile or tiles.

It is thus seen that the present invention provides a new and novel metallic multiwall insulating tile thermal protection system for hypervelocity vehicles that may be mechanically attached thereto with a slip-joint and simple support with no through attachments required except for the last tile in each row. Also, the use of vented tiles, thereby not requiring vacuum leak-free construction, and the beaded edge seals that nest with corresponding beaded edges of adjacent multiwall tiles are additional advantageous features of the present invention that lead to greatly reduced thermal stress in the primary vehicle structures.

Although the invention has been described relative to specific embodiments thereof, these are to be considered as exemplary only and not limiting. For example, although the invention has been described relative to hypervelocity aerial vehicles, it is not so limited and is equally applicable to any enclosure that is subject to external thermal environment and requiring a thermal protection system. There are thus, obviously numerous modifications and variations of the present invention that will be readily apparent to those skilled in the art in the light of the above teachings without departing from the spirit and scope of the instant invention. It is therefore to be understood that within the scope of the appended claims that the invention may be practiced otherwise than as specifically described herein.

What is claimed as new and desired to be secured by Letters Patent of the United States is:

1. A thermal protection sandwich panel adapted to serve as an exterior heat shield insulating tile in the thermal protection system of a hypervelocity vehicle or other enclosure comprising:
   an outer skin for the sandwich panel,
   an inner skin for the sandwich panel spaced from said outer skin,
   side skins sealingly attached to said inner and outer skins to form a unitary panel structure,
   at least one intermediate thermal protective layer of material confined within the space bounded by said outer skin, said inner skin and said side skins, said at least one intermediate thermal protective layer of material being attached to at least one of said inner and outer skin, means secured to said inner skin for mechanically attaching the unitary panel structure to a hypervelocity vehicle or other enclosure said means secured to said inner skin for mechanically attaching the unitary panel structure to a hypervelocity vehicle including a pair of tab extensions extending one each from adjacent corners of said panel and a pair of open panel clips disposed one each on the corners of said panel opposite to said tabs, and connecting clips provided on the vehicle surface and equal in number to and adapted to receive said tab extensions, said tab extensions, said tab extensions being of adequate length to extend through said connecting clips and also be received by the said panel clips of an adjacent panel.

2. The thermal protection sandwich panel of claim 1 wherein said inner and outer skins are formed of a metal foil and said at least one intermediate thermal protective layer of material comprises a plurality of alternate dimpled and flat metal foil layers attached as a unitary structure to each other and to said inner and outer skins by being bonded at the dimpled crests to the adjacent flat metal foil layers.

3. The thermal protection sandwich panel of claim 2 wherein said inner skin, said outer skin, said side skin and each of said intermediate layers are formed from a titanium alloy.

4. The thermal protection sandwich panel as in claim 1 including compressible felt packing means disposed on the periphery of said inner skin so as to engage and seal said panel to an enclosure when said panel is employed as thermal protection for an enclosure.

5. The thermal protection sandwich panel of claim 4 wherein each of said side skin is provided with a beaded surface area.

6. The thermal protection sandwich panel of claim 1 wherein each of said side skins sealingly attached to said inner and said outer skin are angularly disposed approximately 30° relative to a vertical plane through said inner and said outer skin.

7. The thermal protection sandwich panel of claim 1 wherein said outer skin is provided with an edge on two sides thereof that serve to overlap portions of adjacent sandwich panels when assembled on a hypervelocity vehicle.

8. The thermal protection sandwich panel of claim 1 wherein said outer skin is formed of a pair of spaced nickel alloy foil sheets and an intermediate dimpled foil sheet all bonded into a unitary skin by attachment of the flat sheets to said dimpled sheet at the dimple crests thereof, said inner skin being formed of a pair of spaced titanium alloy foil sheets and an intermediate dimpled foil sheet of titanium alloy, all bonded into a unitary skin by attachment of the flat sheets to said dimpled sheets at the dimple crests thereof, and said at least one intermediate thermal protective layer of material being a layer of fibrous insulation compressed between and in contact with each of said inner and outer skins.

9. The thermal protection sandwich panel of claim 8 wherein said nickel alloy foil sheets of said outer skin comprise an exterior foil of approximately 0.003 inch thickness, a dimpled foil layer of approximately 0.003 inch thickness and an inner foil sheet of approximately 0.0015 inch thickness.

10. The thermal protection sandwich panel of claim 8 wherein said titanium alloy foil sheets of said inner skin comprise an exposed layer of approximately 0.003 inch thickness titanium alloy foil, a dimpled titanium alloy foil layer of 0.003 inch thickness and an inner titanium alloy foil layer of 0.0015 inch thickness, said titanium alloy foil being Ti-6Al-4V.

11. The thermal protection sandwich panel of claim 8 wherein said layer of fibrous insulation is selected from the group consisting of fibrous insulation having a density of 4.5 lb/ft$^3$ and 6.2 lb/ft$^3$.

12. The thermal protection sandwich panel of claim 1 wherein said outer skin comprises a columbium waffle having a 0.003 inch coating of silicide thereon, said side skins being formed of silicide coated columbium, said inner skin being formed of multiwall titanium alloy foil sheets, said at least one intermediate thermal protective layer comprising a zirconia cloth bag, each said bag containing a first layer of fibrous insulation and a second layer of fibrous zirconia insulation, said bags being closed with zirconia thread and disposed within said panel spaced from said silicide coated columbium waffle and in contact with said multiwall titanium alloy inner skin.

13. The thermal protection system of claim 12 wherein said zirconia bags are bonded to said multiwall titanium alloy inner skin so as to position the layer of fibrous insulation adjacent but spaced from said silicide coated columbium waffle, said fibrous insulation having a density of approximately 4.5 lb/ft$^3$.

14. In combination with an enclosure adapted to be subjected to elevated temperatures and a thermal protection system for the enclosure, the improvement therewith comprising:

a plurality of thermal protection tiles attached to the exterior surface areas of the enclosure that requires thermal protection, said plurality of tiles being arranged in staggered rows, each of said plurality of tiles being provided with overlapping edges to overlap portions of the tiles in the same and in an adjacent row, mechanical attachment means on each said tile and on said enclosure surface for mechanically attaching said tiles to said enclosures, packing means secured to each said tile adapted to be compressed between said tile and said enclosure when said tiles and said enclosure are mechanically connected, said mechanical attachment means on each said tile and on said enclosure surface including a pair of elongated tabs secured one each to adjacent corners of each said tile, first clip means fixedly disposed on said enclosure surface to receive each of said tabs, second clip means fixedly disposed one each on the corners of each said tile opposite to said elongated tabs, and said second clip means adapted to receive said elongated tabs from an adjacently assembled tile.

15. The combination of claim 14 wherein each said tile is provided with an outer skin, an inner skin, side skins sealingly attached to said inner and outer skins to make a unitary confined area therebetween, and at least one intermediate thermal protection layer of material confined within the area bounded by said inner, said outer and said side skins.

* * * * *